United States Patent
Hedtke

(10) Patent No.: US 7,258,017 B1
(45) Date of Patent: Aug. 21, 2007

(54) INDUSTRIAL PROCESS PRESSURE TRANSMITTER WITH FIELD REPAIRABLE REMOTE SEALS

(75) Inventor: Robert Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/401,019

(22) Filed: Apr. 10, 2006

(51) Int. Cl.
G01L 19/04 (2006.01)
(52) U.S. Cl. ........................................ 73/708
(58) Field of Classification Search ................. 73/708, 73/706, 730
See application file for complete search history.

(56) References Cited

U.S. PATENT DOCUMENTS

| | | | |
|---|---|---|---|
| 4,598,581 | A | 7/1986 | Brekke |
| 5,605,360 | A | 2/1997 | Kurisaki et al. |
| 5,670,722 | A | 9/1997 | Moser et al. |
| 5,765,436 | A | 6/1998 | Wilda et al. |
| 6,675,655 | B2 | 1/2004 | Broden et al. |
| 7,036,381 | B2 * | 5/2006 | Broden et al. ............. 73/708 |
| 2005/0126296 | A1 * | 6/2005 | Hedtke ..................... 73/706 |
| 2005/0225035 | A1 * | 10/2005 | Sundet ..................... 277/590 |
| 2005/0284227 | A1 * | 12/2005 | Broden et al. ............. 73/708 |
| 2006/0162458 | A1 * | 7/2006 | Broden ..................... 73/708 |
| 2006/0162459 | A1 * | 7/2006 | Broden ..................... 73/715 |

OTHER PUBLICATIONS

Honeywell, 34-ST-03-64 Specification and Model Selection Guide, "ST 3000 Smart Transmitter Series 100 Remote Diaphragm Seals Models", 3 pages.
Webpage, Advanta NewAge Industries, "AdvantaPure Fittings Tri-Clamp", http://www.advantapure.com/fittings/triclmp.html, 1 page, Jul. 11, 2005.
Webpage, Stedim, Stedim Bioprocess Systems Single-Use Bag Systems Mini Tri-Clamp, http://www.stedim.com/p2A_connect_triclamp.php, 1 page, Jul. 11, 2005.
Honeywell, 34-ST-03-26 Specification, "ST 3000 Smart Transmitter 3-A Sanitary Flange Mount and Sanitary Remote Seal Models", 4 pages.
Webpage, SMAR International, "SMAR—First in Fieldbus—SR301—Remote Seals", https://www.smar.com/products/sr301.asp, 2 pages, Jul. 11, 2005.
Product Information Sheet, "Type 12 Sanitary Ladish Tri-Clamp®' Sanitary Seal", 1 page.
Webpage, Thomas Publishing LLC, "Pressure Transmitter Meets 3A Sanitary Standard 37-01., Dresser Instrument", http://news.thomasnet.com/fullstory/22356/2697, 4 pages, Jul. 11, 2005.

* cited by examiner

Primary Examiner—Andre J. Allen
(74) Attorney, Agent, or Firm—Kinney & Lange, P.A.

(57) ABSTRACT

A pressure measurement system includes a pressure transmitter and a remote seal assembly, and a capillary tube that connects a housing of the remote seal with a housing of the pressure transmitter utilizing at least one negligible-leakage quick connect coupling.

20 Claims, 4 Drawing Sheets

INDUSTRIAL PROCESS PRESSURE TRANSMITTER WITH FIELD REPAIRABLE REMOTE SEALS

BACKGROUND OF THE INVENTION

The present invention relates to the process control industry. More particularly, the present invention relates to remote seals and capillary tubes utilized in conjunction with pressure transmitters.

Pressure transmitters are used to remotely monitor the pressure of a process fluid. Remote seals, or remote diaphragm assemblies, are often used to distance the pressure transmitter from hazardous measurement environments, or for linking the pressure transmitter with inconveniently located process fluids. For example, remote seals are often used with corrosive or high temperature process fluids. In those situations, a remote seal having a diaphragm assembly and a capillary tube can be used to relate the pressure transmitter to the process fluid while the pressure transmitter is located a safe distance away. The capillary tube may extend tens of meters in order to couple the pressure transmitter with the process fluid. The remote seal communicates hydraulically with the process fluid through a thin, flexible diaphragm, which is used to isolate the process fluid from a fill fluid used in the capillary tube. As the diaphragm flexes, the incompressible fill fluid translates the pressure change through the capillary tube to a diaphragm located in the pressure transmitter. Deflection of the pressure transmitter diaphragm is transmitted through a similar method to a pressure sensor, which produces a signal relating to the pressure of the process fluid.

Remote seal hydraulic systems are filled at the factory with a precise amount of fill fluid and sealed. System performance is correlated with the precise level of fill fluid and is degraded with any oil leakage or the presence of air in the fill fluid. For severe applications, such as high process temperature or high process vacuum service, specialized factory production methods are used to remove air from the fill fluid and permanently seal the hydraulic system. For many less severe applications, the loss of a minute amount of fill fluid oil is acceptable.

Capillary tubes and remote seal diaphragms can be compromised due to wear and tear, accidents, and maintenance procedures, thereby causing leakage of fill fluid. For example, they can be cut or crimped as they are routed to their remote locations and therefore need to be repaired or replaced. Current methods for connecting the capillary tube to the pressure transmitter and remote seal include the use of a threaded or welded connection. These connections are not repairable in the field and are themselves a source of fluid leaks.

As such, it is desirable for less severe applications to have a field repairable, replaceable, and upgradeable remote seal system whereby leakage is minimized during coupling and uncoupling of the components and during operation.

BRIEF SUMMARY OF THE INVENTION

A pressure measurement system includes a pressure transmitter, a remote seal assembly, and a capillary tube that connects a housing of the remote seal with a housing of the pressure transmitter utilizing at least one negligible-leakage quick connect coupling.

DETAILED DESCRIPTION

Figure 1A:
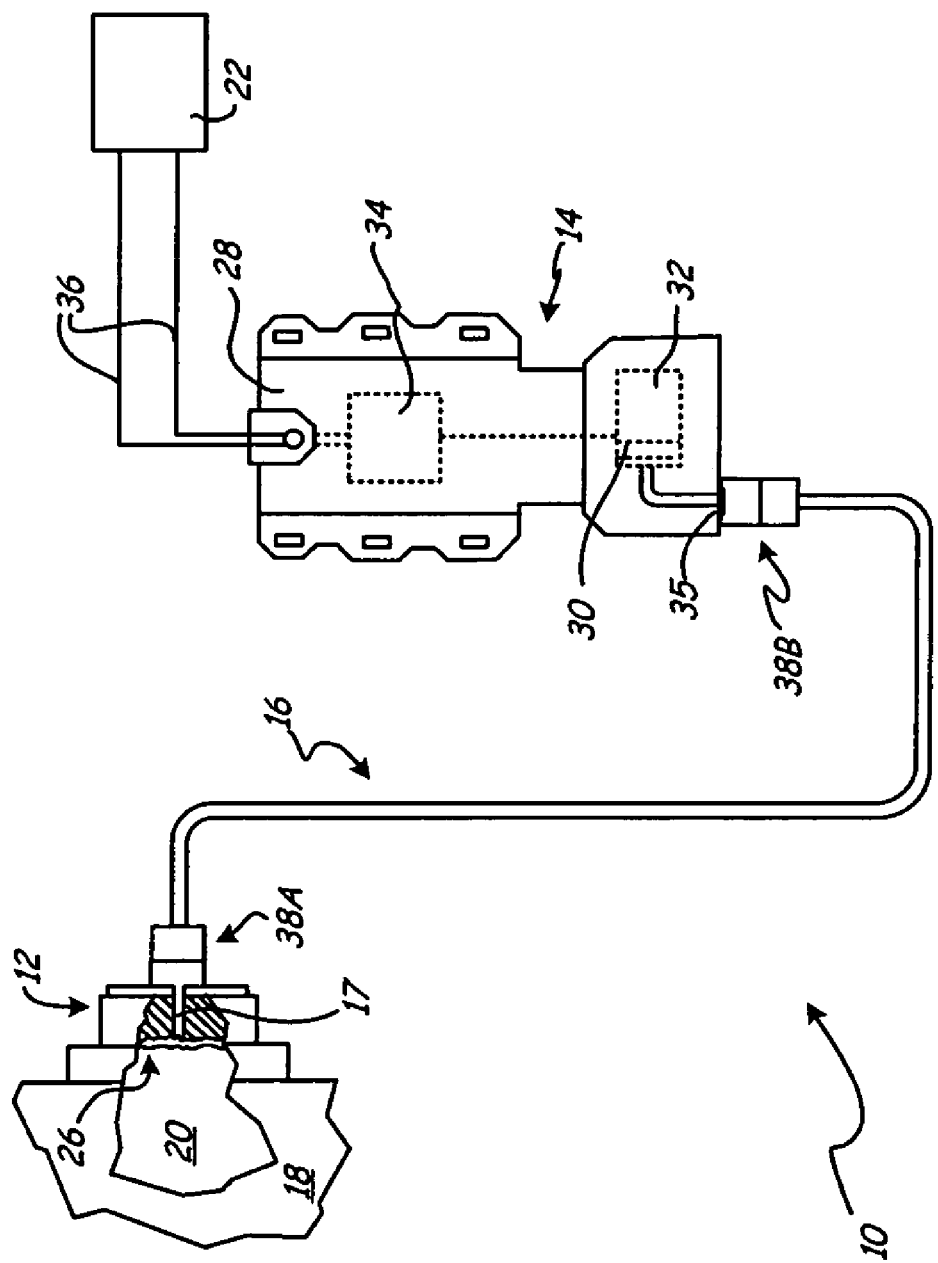
FIG. 1A shows a partially cut-away assembled process control system utilizing a remote seal in accordance with the present invention.
Figure 1B:
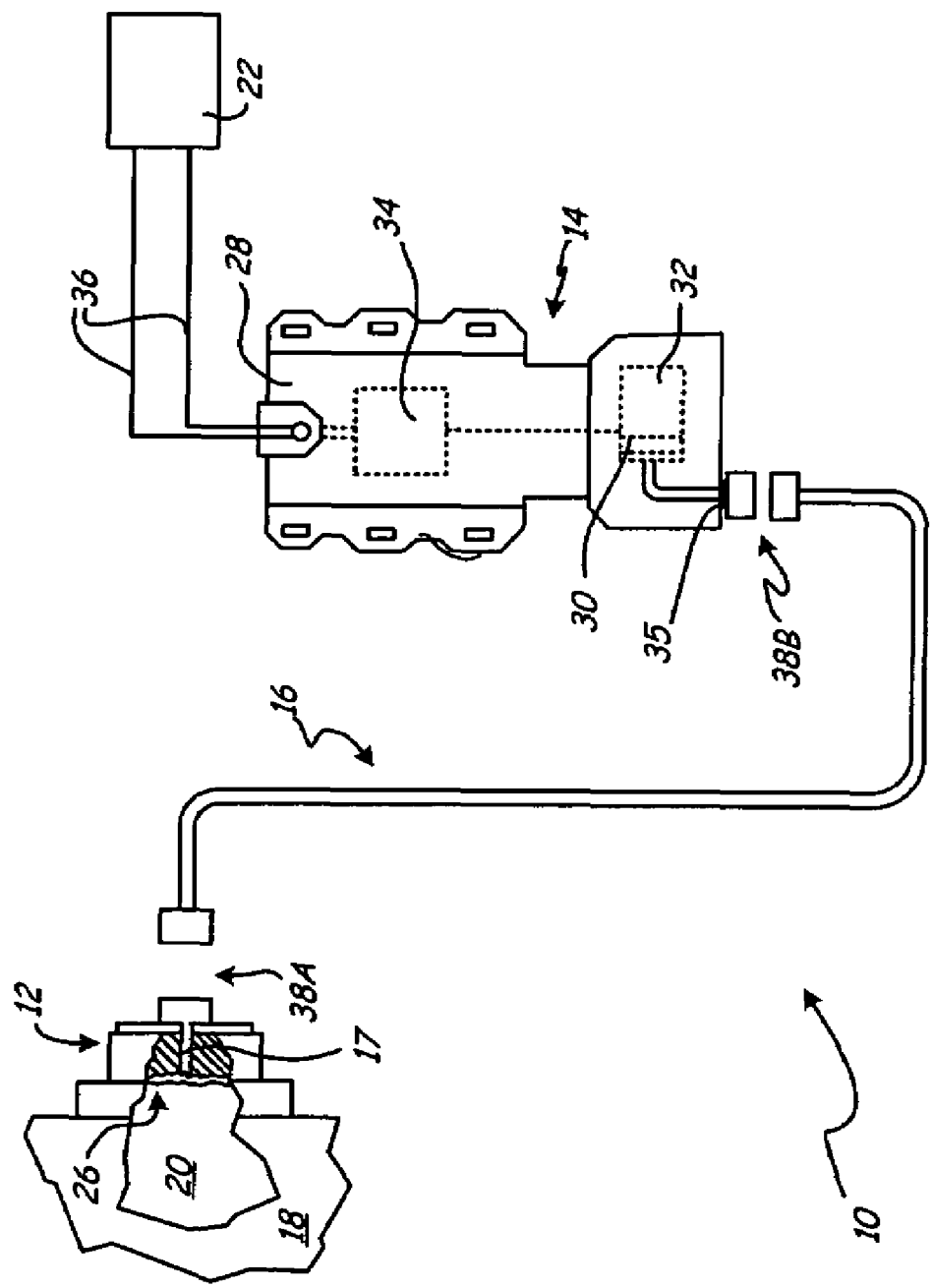
FIG. 1B shows the same system as FIG. 1A, but in an unconnected, modular state in accordance with the present invention.

FIG. 1A shows process control system 10, which includes remote seal 12, pressure transmitter 14, capillary tube 16, vessel 18, process fluid 20, and process control circuitry 22. Pressure transmitter 14 includes transmitter housing 28, which contains sensor diaphragm 30, pressure sensor 32, transmitter circuitry 34 and process diaphragm 35. Remote seal 14 conveys the pressure of process fluid 20 to process transmitter 14, whereby sensor 32 and transmitter circuitry 34 produce a pressure reading that is conveyed to process control circuitry through control loop 36. Couplings 38A and 38B link remote seal 12, pressure transmitter 14 and capillary tube 16 with each other such that they can be easily, and with negligible fluid loss, disconnected. FIG. 1B shows system 10 of FIG. 1A with couplings 38A and 38B uncoupled.

Remote seal 12 is in hydraulic communication with process fluid 20 contained in vessel 18 through diaphragm 26, and with pressure transmitter 14 via capillary tube 16 and passageway 17, which are charged with a fill fluid. The fill fluid is a substantially incompressible hydraulic fluid for transmitting fluid pressure applied by process fluid 20 to diaphragm 26 to pressure transmitter 14. Typically, the hydraulic fluid comprises silicone oil, glycerin and water, propylene glycol and water, or any other fluid that is substantially incompressible, and may contain other additives. Capillary tube 16 is linked with remote seal 12 using quick connect coupling 38A, and with transmitter 14 using quick connect coupling 38B. Thus, pressure transmitter 14 can sense fluid pressure applied to diaphragm 26 by process fluid 20 through the hydraulic fill fluid. Process fluid 20 could, for example, be a corrosive or an extremely hot process fluid, such that pressure transmitter 14 is unable to contact, or operate in close proximity to, process fluid 20. Thus, remote seal 12 and capillary tube 16 are used to extend the reach of pressure transmitter 14. Remote seal 12 is typically mounted to vessel 18 with flanges and bolts.

A change in the pressure of process fluid 20 is hydraulically communicated to process diaphragm 35 by the fill fluid of capillary 16. This pressure is then communicated to pressure sensor 32 with a second fill fluid positioned between process diaphragm 35 and sensor diaphragm 30. The deflection of sensor diaphragm 30 in response to a change in the pressure of process fluid 20 is used to determine the pressure in vessel 18 with sensor 32. Sensor 32 can be, for example, a capacitance-based pressure cell, in which the capacitance of pressure sensor 32 changes as a function of the pressure of process fluid 20, or can operate on other known sensing principles, such as piezoresistive strain gauge technology. Pressure sensor 32 produces a pressure signal, based upon the deflection of sensor diaphragm 30, that is indicative of the pressure of process fluid 20. Transmitter circuitry 34 within transmitter housing 28 produces an output signal that is a function of the pressure sensed by sensor 32 and communicates the pressure signal to process control circuitry 22 over control loop 36 so that the sensed pressure of process fluid 20 can be remotely monitored. Process control loop 36 can be a 4-20 mA control loop, a wired digital communication network, a wireless network or any other suitable communication system. In other embodiments, process transmitter 14 includes means for locally monitoring the pressure, such as an LCD display.

Capillary tube 16 is connected to remote seal 12 by quick connect coupling 38A and to pressure transmitter 14 by quick connect coupling 38B. Quick connect couplings 38A and 38B provide means for interconnecting remote seal 12, process transmitter 14, and capillary 16. Quick connect couplings 38A and 38B include a first connector and a second connector, which can be, alternatively, male and female ends of a negligible-leakage quick connect coupling. The use of quick connect couplings 38A and 38B minimizes fluid spillage upon coupling and uncoupling of the first and second connectors. Thus, as shown in FIG. 1B, each of the modular components connected with quick connect couplings 38A or 38B (remote seal 12, transmitter 14 or capillary 16) can be easily removed from process control system 10 in the field, thus allowing easy replacement or repair of each component.

Figure 2A:
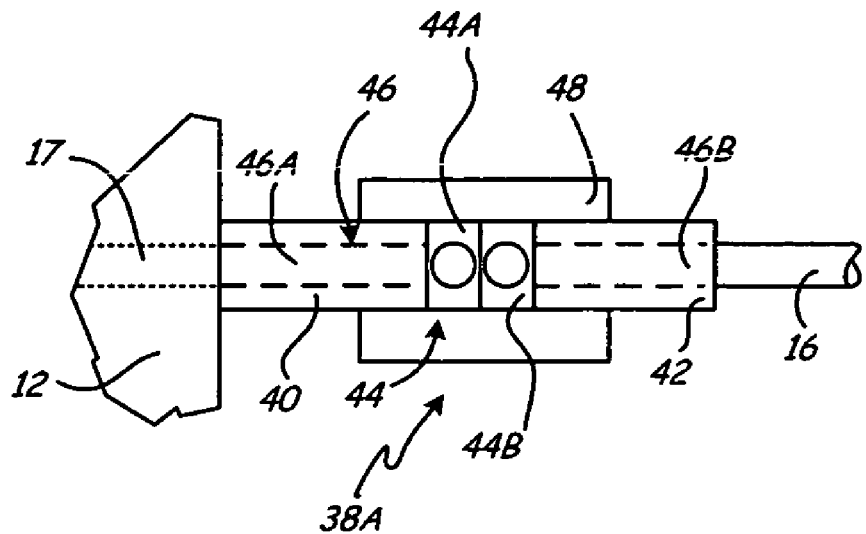
FIG. 2A shows a simplified view of an assembled quick-connect coupling used in the process control system of the present invention.

FIG. 2A shows a simplified view of an assembled quick connect coupling 38A of the present invention, which is connected with remote seal 12 and capillary 16. Quick connect coupling 38A is representative of couplings 38A and 38B wherein each coupling comprises the same or similar components. Coupling 38A comprises first connector 40 and second connector 42, which interlock to form a negligible-leakage valve system 44 (comprised of valve 44A and 44B). First connector 40 and second connector 42 together comprise passageway 46 (comprised of passageways 46A and 46B), which allows fill fluid in passageway 17 to combine with fill fluid in capillary 16. Locking mechanism 48 is used to mechanically link first connector 40 with second connector 42. When first connector 40 and second connector 42 are interlocked, valve system 44 is in an open state, which allows fluid to pass through passageway 46, from capillary 16 to passageway 17 of remote seal 12.

Figure 2B:
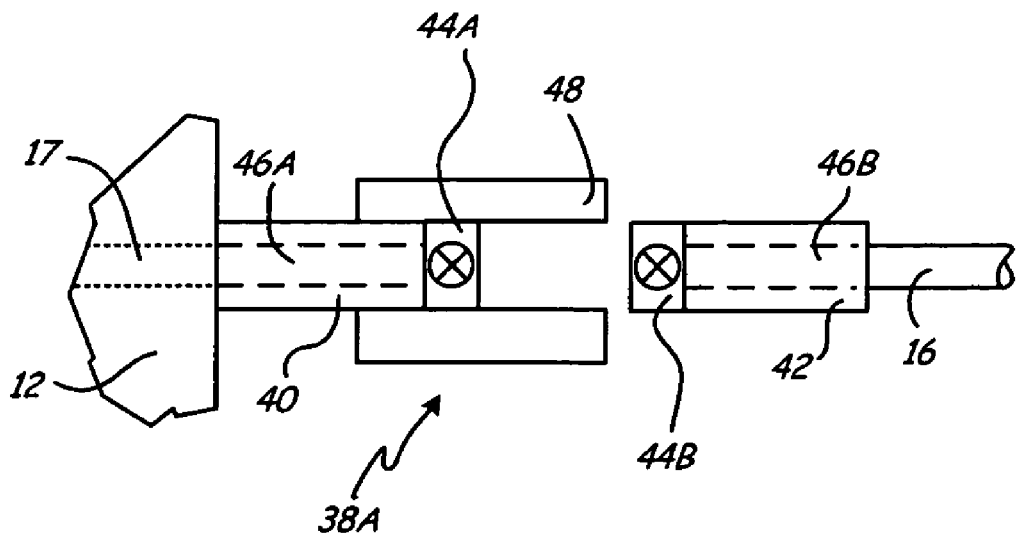
FIG. 2B shows the quick-connect coupling of FIG. 2A uncoupled.

FIG. 2B shows an unassembled view of quick connect coupling 38A of FIG. 2A. When first connector 40 and second connector 42 are disconnected, valve system 44 is in a closed state, and fluid is prevented from flowing through passageway 46. Specifically, valve 44A prevents fluid inside passageway 17 from exiting passageway 46A, and valve 44B prevents fluid inside passageway 46B from exiting capillary 16. Thus, together valves 44A and 44B form a negligible-leakage coupling system in which a negligible amount of fill fluid is lost during coupling and uncoupling of valve system 44. Ideally, valve system 44 prevents any fill fluid from escaping passageway 46, however a negligible amount of fill fluid inevitably escapes. Thus, valve system 44 may be referred to as a negligible-leakage valve system since they are particularly suited for applications in which a very small amount of fill fluid loss is acceptable. Valve system 44 may be a drybreak valve, non-spill valve, flat face valve, clean break valve, spring loaded poppet valve, ball valve, or any other suitable negligible-leakage valve that is commercially available in a quick connect coupler.

Specifically, in one embodiment of the invention, quick connect coupler 38A comprises a 71 Series Drybreak, flush face quick connect coupling commercially available from Snap-Tite, Inc., Erie, Pa. In other embodiments, other commercial quick connect couplings are used such as: a non-spill hydraulic quick coupling available from Parker Quick Coupling Division, Minneapolis, Minn.; a flat face, drybreak coupling available from Pressure Connections Corp., Columbus, Ohio; a hydraulic brake and clutch coupling with safety clip and lanyard available from Aeroquip Corporation, Maumee, Ohio; an Ultra-Mate coupling available from Eaton Aerospace, Irvine, Calif.; or a Series QA 2900 quick coupling available from Tuthill Corporation, Berea, Ohio.

Typically, quick connect coupling 38A includes a female connector and a male connector. In the embodiment shown, connector 40, which is joined with remote seal 12, is the female connector and connector 42, which is joined with capillary 16, is the male connector. Alternatively, remote seal 12 may be connected with the male connector, and capillary 16 connected with a female connector. Connectors 40 and 42 each include a valve such that quick connect coupling 38A comprises a dual-valve, negligible leakage coupling system. Specifically, connector 40 includes valve 44A, and connector 42 includes valve 44B. Typically, valves 44A and 44B are spring-loaded plunger type valves that remain tightly closed when disengaged from the other connector. When the connectors are joined together, the plungers are positioned in opposition such that they compress the springs and force the plungers to open the valves, thereby allowing fluid flow from one connector to the other. Locking mechanism 48 holds the connectors together and retains the plungers in the open position. In one embodiment, locking mechanism 48 is a spring-loaded retractable sleeve that includes a ball lock. In another embodiment, locking mechanism 48 includes a safety clip that prevents the retractable sleeve from accidentally retracting.

Valve system 44 is closed prior to insertion of male connector 42 into female connector 40, and is open when male connector 42 is coupled with female quick connector 40. There is minimum exposure of the fill fluid to the atmosphere during the coupling or uncoupling of valve system 44. When connector 40 and connector 42 are fully connected, capillary tube 16 is in hydraulic communication with diaphragm 26. Thus, quick connect coupling 38A is advantageous for making field repairs in remote seals and is particularly suited for use in process control systems in which negligible fill fluid loss is acceptable. Particularly, quick connect coupling 38A is advantageous for field upgradeability and repairability.

First connector 40 is joined with remote seal 12 in any suitable manner, such as with welding or a threaded joint. In other embodiments, connector 40 is integrally formed as part of the housing of remote seal 12. Similarly, capillary 16 is joined with second connector 42 in any suitable manner, typically with a threaded or welded joint.

Figure 3:
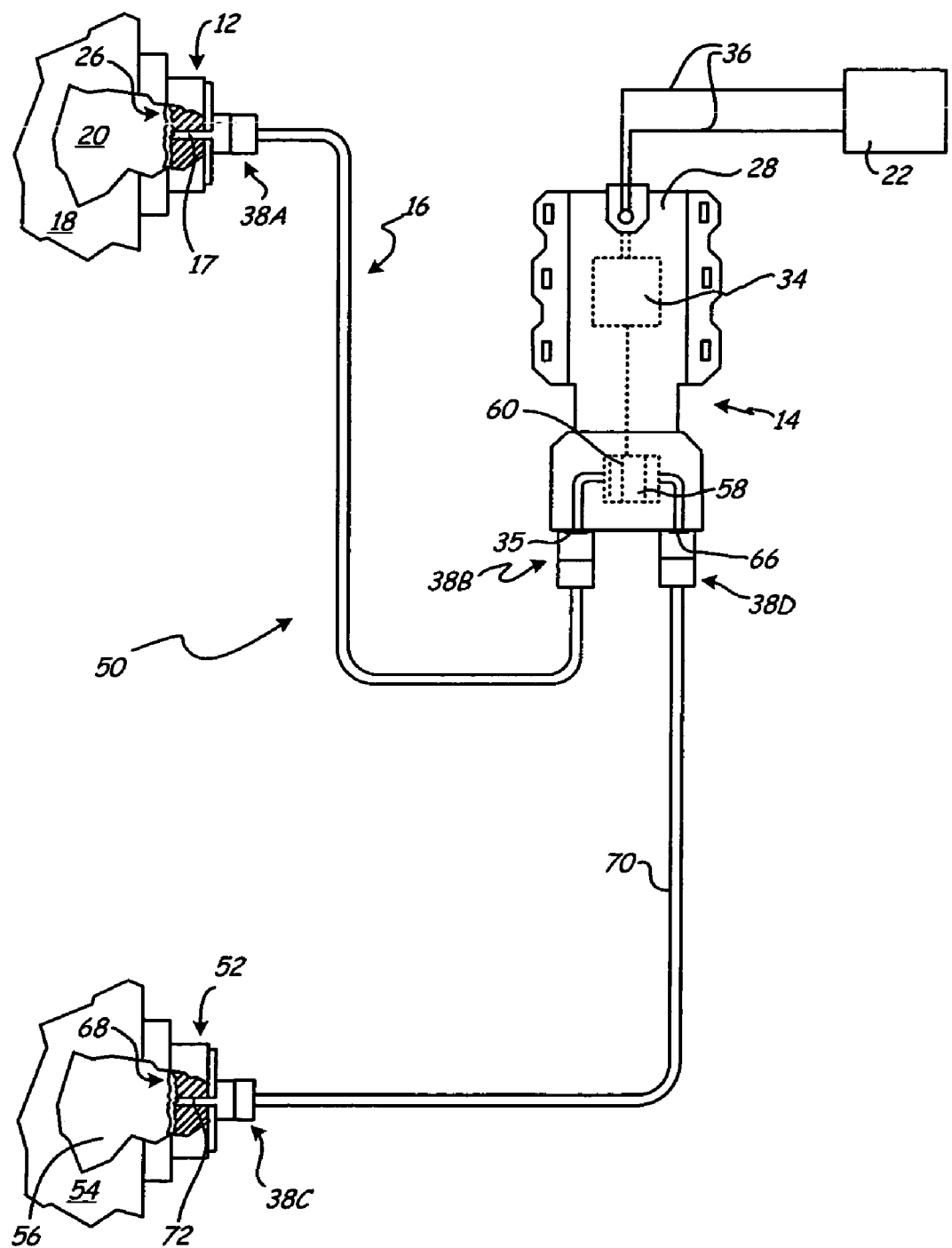
FIG. 3 shows another common implementation of the process control system utilizing two remote seals in accordance with the present invention.

FIG. 3 shows another embodiment of process transmitter 14 in which it is configured for a balanced differential pressure measurement. Process control system 50 includes components used in process control system 10 of FIGS. 1A and 1B, and common numbering is used where applicable. Process control system 50 includes remote seals 12 and 52, vessels 18 and 54, process fluids 20 and 56 (which may be different portions of the same fluid), process transmitter 14, and control system 22. Process transmitter 14 includes pressure sensor 58, which is configured for differential pressure measurement and includes sensor diaphragm 60 and process diaphragms 35 and 66.

Remote seal 12 is in hydraulic communication with process fluid 20 contained in vessel 18 through diaphragm 26, and with pressure transmitter 14 via capillary tube 16 and passageway 17, which are charged with fill fluid. The fill fluid is a substantially incompressible hydraulic fluid for transmitting fluid pressure applied by process fluid 20 to diaphragm 26 to pressure transmitter 14. Capillary tube 16 is linked with remote seal 12 using quick connect coupling 38A, and with transmitter 14 using quick connect coupling 38B. The fill fluid transmits the pressure of process fluid 20 from diaphragm 26 to process diaphragm 35, where another fill fluid conveys the pressure to sensor diaphragm 60. Thus, differential pressure sensor 58 is provided with a first pressure signal.

Remote seal 52 is in hydraulic communication with process fluid 56 contained in vessel 54 through diaphragm 68, and with pressure transmitter 14 via capillary tube 70 and passageway 72, which are charged with fill fluid. The fill fluid is a substantially incompressible hydraulic fluid for transmitting fluid pressure applied by process fluid 56 to diaphragm 68 to pressure transmitter 14. Capillary tube 70 is linked with remote seal 52 using quick connect coupling 38C, and with transmitter 14 using quick connect coupling 38D. The fill fluid transmits the pressure of process fluid 56 from diaphragm 68 to process diaphragm 66, where another fill fluid conveys the pressure to sensor diaphragm 60. Thus, pressure transmitter 14 is provided with a second pressure signal, and differential pressure sensor 58 can sense the difference in fluid pressure applied to diaphragm 26 by process fluid 20 and to diaphragm 68 by process fluid 56.

In other embodiments of process control system 50, process transmitter 14 can be located directly on vessel 18 at the site of remote seal 12, or on vessel 54 at the site of remote seal 52. Process control system 50 can be setup for various tuned or balanced differential pressure configurations.

Although the present invention has been described with reference to preferred embodiments, workers skilled in the art will recognize that changes may be made in form and detail without departing from the spirit and scope of the invention.

The invention claimed is:

1. A pressure measurement system comprising:
   a pressure transmitter including a transmitter housing, a pressure sensor for sensing a pressure of a process fluid, and transmitter circuitry for producing an output signal that is a function of pressure sensed by the pressure sensor;
   a remote seal assembly for communicating with the process fluid, the remote seal assembly comprising:
   a remote seal housing;
   a capillary tube for communicating the process fluid pressure to the pressure transmitter via a fill fluid, wherein the capillary tube connects the remote seal housing and the transmitter housing utilizing a negligible-leakage quick connect coupling; and
   a pressure diaphragm for isolating the process fluid from the fill fluid.

2. The pressure measurement system of claim 1 and further comprising a second remote seal assembly for communicating with the process fluid wherein the second remote seal assembly comprises:
   a second remote seal housing;
   a second capillary tube for communicating the process fluid pressure to the pressure transmitter via a second fill fluid, wherein the second capillary tube connects the second remote seal housing and the transmitter housing utilizing a second negligible-leakage quick connect coupling; and
   a second pressure diaphragm for isolating the process fluid from the second fill fluid.

3. The pressure measurement system of claim 1 wherein the remote seal housing is connected with the capillary tube with the quick connect coupling.

4. The pressure measurement system of claim 1 wherein the transmitter housing is connected with the capillary tube with the quick connect coupling.

5. The pressure measurement system of claim 1 wherein the negligible-leakage quick connect coupling comprises mating male and female connectors.

6. The pressure measurement system of claim 5 wherein the process transmitter housing includes a connector for a negligible-leakage quick connect coupler for receiving a mating connector of a negligible-leakage quick connect coupler.

7. The pressure measurement system of claim 5 wherein the remote seal housing includes a connector for a negligible-leakage quick connect coupler for receiving a mating connector of a negligible-leakage quick connect coupler.

8. The pressure measurement system of claim 5 wherein the male and female connectors prevent fluid flow through the connectors when uncoupled.

9. The pressure measurement system of claim 5 wherein the male and female connectors allow fluid flow between the connectors when coupled.

10. The pressure measurement system of claim 1 wherein the quick connect coupling is a valved coupling.

11. The pressure measurement system of claim 1 wherein the quick connect coupling comprises a flat face coupling.

12. The pressure measurement system of claim 1 wherein the quick connect coupling comprises a drybreak coupling.

13. The pressure measurement system of claim 1 wherein the quick connect coupling comprises a poppet style quick disconnect.

14. The pressure measurement system of claim 1 wherein the negligible leakage quick connect coupling comprises a coupling that reduces spillage of the fill fluid during coupling and uncoupling such that they are suitable for use in less severe applications.

15. A remote seal assembly for connecting a process transmitter with a process fluid, the remote seal assembly comprising:
   a remote seal housing;
   a capillary tube for communicating a pressure of the process fluid to the pressure transmitter via a fill fluid;
   a pressure diaphragm for isolating the process fluid from the fill fluid;
   a quick connect coupling disposed between the remote seal housing and capillary tube for connecting the capillary tube with the remote seal housing.

16. The remote seal assembly of claim 15 wherein the quick connect coupling comprises a valved coupling.

17. The remote seal assembly of claim 15 wherein the quick connect coupling comprises a female connector and a male connector.

18. The remote seal assembly of claim 17 wherein the quick connect coupling prevents fluid flow from the capillary and the housing when the male and female connectors are disengaged.

19. The remote seal assembly of claim 17 wherein the quick connect coupling allows fluid flow from the capillary and the housing when the male and female connectors are engaged.

20. A pressure transmitter for sensing the pressure of a process fluid, the pressure transmitter comprising:
   a housing;
   a pressure sensor for sensing pressure;
   transmitter circuitry for producing an output signal that is a function of pressure sensed by the pressure sensor; and
   a quick connect coupler positioned on the housing for receiving a quick connect coupler of a capillary tube of a remote seal assembly such that the pressure sensor can be fluidly linked with the capillary tube.

* * * * *